US011661023B2

(12) United States Patent
Song et al.

(10) Patent No.: US 11,661,023 B2
(45) Date of Patent: May 30, 2023

(54) DRIVER SEAT AIRBAG APPARATUS FOR VEHICLE, CONTROL SYSTEM THEREFOR, AND CONTROL METHOD FOR THE SYSTEM

(71) Applicant: HYUNDAI MOBIS CO., LTD., Seoul (KR)

(72) Inventors: Min June Song, Seoul (KR); Seok Hoon Ko, Yongin-si (KR); Geum Dong Kim, Seongnam-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/587,150

(22) Filed: Jan. 28, 2022

(65) Prior Publication Data
US 2022/0242355 A1 Aug. 4, 2022

(30) Foreign Application Priority Data

Feb. 3, 2021 (KR) .................. 10-2021-0015571

(51) Int. Cl.
*B60R 21/203* (2006.01)
(52) U.S. Cl.
CPC .................. *B60R 21/203* (2013.01)
(58) Field of Classification Search
CPC . B60R 21/013; B60R 21/203; B60R 21/2035; B60R 11/0229; B60R 11/0235
See application file for complete search history.

(56) References Cited

U.S. PATENT DOCUMENTS

| | | | | |
|---|---|---|---|---|
| 5,507,521 A | * | 4/1996 | Steffens, Jr. ........... | B62D 1/197 280/775 |
| 6,394,489 B1 | * | 5/2002 | Faigle ................. | B60R 21/2035 280/731 |
| 7,631,892 B2 | * | 12/2009 | Ishikawa ............... | B60R 21/237 280/743.1 |
| 7,874,576 B2 | * | 1/2011 | Gandhi ................. | B60R 21/203 280/728.2 |
| 9,834,121 B2 | * | 12/2017 | Riefe ....................... | B62D 1/04 |
| 10,793,178 B1 | * | 10/2020 | del Toro Reyna ....... | B62D 1/11 |
| 10,857,884 B2 | * | 12/2020 | Derrick ................. | B60R 21/203 |
| 10,899,301 B2 | * | 1/2021 | Kulkarni ............. | B60R 21/2037 |
| 11,292,415 B2 | * | 4/2022 | Mimura ................ | B60R 21/203 |
| 11,427,147 B2 | * | 8/2022 | Song ................. | B60R 21/21656 |
| 11,511,696 B2 | * | 11/2022 | Song ................... | B60R 21/2346 |

(Continued)

FOREIGN PATENT DOCUMENTS

DE 19911682 A1 * 9/2000 ............ B60R 21/05
DE 102017120770 A1 * 3/2019
(Continued)

*Primary Examiner* — Laura Freedman
(74) *Attorney, Agent, or Firm* — NovoTechIP International PLLC (57) ABSTRACT

A driver seat airbag apparatus for a vehicle is proposed. The driver seat airbag apparatus includes an airbag module including an airbag cushion and an inflator, and provided in rear of a functional unit at a center portion of a steering wheel, and an actuator provided at the steering wheel and connected to the functional unit, and in operation thereof, the actuator being configured to move the functional unit to expand an unfolding space of the airbag cushion between the functional unit and the airbag module.

10 Claims, 9 Drawing Sheets

(56) References Cited

U.S. PATENT DOCUMENTS

| | | | |
|---|---|---|---|
| 11,529,922 B2 * | 12/2022 | Mihm | B60R 11/0235 |
| 2016/0325662 A1 * | 11/2016 | Nash | B62D 1/04 |
| 2022/0063548 A1 * | 3/2022 | Ko | B60R 21/21656 |
| 2022/0227323 A1 * | 7/2022 | Von Roden | B62D 1/10 |

FOREIGN PATENT DOCUMENTS

| | | | | |
|---|---|---|---|---|
| JP | 2015110368 | A | * | 6/2015 |
| KR | 10-2012-0044831 | A | | 5/2012 |
| KR | 20220026389 | A | * | 3/2022 |
| KR | 20220030690 | A | * | 3/2022 |
| KR | 20220030691 | A | * | 3/2022 |
| KR | 20220043550 | A | * | 4/2022 |
| KR | 20220046335 | A | * | 4/2022 |
| KR | 20220054036 | A | * | 5/2022 |
| KR | 20220101437 | A | * | 7/2022 |

\* cited by examiner

DRIVER SEAT AIRBAG APPARATUS FOR VEHICLE, CONTROL SYSTEM THEREFOR, AND CONTROL METHOD FOR THE SYSTEM

CROSS-REFERENCE TO RELATED APPLICATIONS

The present application claims priority to Korean Patent Application No. 10-2021-0015571, filed Feb. 3, 2021, the entire contents of which is incorporated herein for all purposes by this reference.

BACKGROUND

1. Technical Field

The present invention relates generally to a driver seat airbag apparatus for a vehicle and, more particularly, to an airbag cushion configured to guide an unfolding direction of an airbag cushion so that the airbag cushion is unfolded while avoiding a display device mounted to a steering wheel of the vehicle.

2. Discussion of Related Art

As a measure to protect the safety of an occupant of a vehicle, various types of airbag apparatus are provided in the vehicle. Among the various airbag apparatus, a driver seat airbag apparatus is mounted to a steering wheel.

When the driver seat airbag apparatus receives a control signal of an airbag control unit to explode a gas injection device, an airbag cushion protrudes from the steering wheel and is unfolded toward a driver by the pressure of airbag gas sprayed from the gas injection device, so that the unfolded airbag cushion protects the upper body of the driver.

Meanwhile, when an autonomous driving situation in which a vehicle navigates to its own destination without the driver directly operating the steering wheel, accelerator pedal, and brake is realized, a relaxation mode in which the driver relaxes without driving directly may be executed while the vehicle is being driven, and in a relaxation mode, a display device may be provided in the steering wheel for comfortable relaxation of the driver.

However, in a vehicle accident, a driver seat airbag cushion should be unfolded toward the driver while protruding toward the front of the display device, but when the airbag cushion is unfolded while breaking the display device, the driver may be injured by the broken display device.

In order to solve the above problem, a structure in which the airbag cushion is unfolded while avoiding the display device has been developed, but unfolding the airbag cushion in a desired direction is difficult.

The foregoing described as the controller and the controlling method of operating a fuel cell is intended merely to aid in the understanding of the background of the present invention, and is not intended to mean that the present invention falls within the purview of the related art that is already known to those skilled in the art.

SUMMARY

Accordingly, the present invention has been made keeping in mind the above problem occurring in the related art, and the present invention is intended to provide an airbag apparatus for a vehicle, wherein the airbag apparatus is configured to move a functional unit located at a center portion of a steering wheel by an actuator to expand an unfolding space of an airbag cushion and to prevent the airbag cushion from hitting the functional unit in unfolding of the airbag cushion and to protect an occupant with the airbag cushion rapidly unfolded.

In order to achieve the above objective, according to one aspect of the present invention, there is provided a driver seat airbag apparatus for a vehicle, the driver seat airbag apparatus including: an airbag module including an airbag cushion and an inflator, and provided in rear of a functional unit at a center portion of a steering wheel; and an actuator provided at the steering wheel and connected to the functional unit, and in operation thereof, the actuator being configured to move the functional unit to expand an unfolding space of the airbag cushion between the functional unit and the airbag module.

The inflator may be configured to be operated by receiving a vehicle collision signal, and the actuator may be configured to be operated simultaneously with the inflator by receiving the collision signal of the vehicle or be configured to be operated at least before operation of the inflator by receiving a collision expected signal of the vehicle.

The actuator may be configured to expand the unfolding space by rotating the functional unit in a front-rear direction of the steering wheel, in a vertical direction of the steering wheel, or on one portion of the steering wheel.

The actuator may include a first drive motor, a first spindle screw coupled to a shaft of the first drive motor and extended in a longitudinal direction of the shaft, and a first spindle nut screw-coupled to the first spindle screw and having one portion connected to the functional unit, wherein in operation of the first drive motor, the actuator may move the functional unit in the front-rear direction or the vertical direction of the steering wheel in response to movement of the first spindle nut.

The functional unit may include a bracket extended toward the first drive motor from a rear portion of the functional unit and connected to the first spindle nut.

The functional unit may be configured such that a lower portion thereof is rotatably provided at a first hinge, and the actuator may include a second drive motor, a second spindle screw coupled to a shaft of the second drive motor and extended in a front-rear direction of the steering wheel, and a second screw nut screw-coupled to the second spindle screw and moved in a longitudinal direction of the second spindle screw in rotation of the second spindle screw and configured such that one end thereof rotatably connected to an upper portion of the functional unit by a second hinge, wherein in operation of the second drive motor, the second screw nut may be moved in the front-rear direction of the steering wheel to rotate the functional unit on the first hinge.

The airbag module may include an airbag housing configured to store the airbag cushion therein, to unfold the airbag cushion through an upper opening thereof with the inflator located at a lower portion thereof, and coupled to the steering wheel, and the functional unit may be located in front of the airbag housing.

The airbag module may include a housing cover coupled to the airbag housing to cover the opening of the airbag housing, and configured to be broken by an unfolding pressure of the airbag cushion and to open the airbag housing at a limited angle toward front of the steering wheel.

The housing cover may be configured to be rotated on the airbag housing so that a front end thereof may be moved upward and thus the airbag housing be opened toward the front of the steering wheel.

The housing cover may have a rear end further extended rearward than a rear end of the airbag housing in the front-rear direction of the steering wheel, and the housing cover may be rotated on the airbag housing, and thus the rear end of the housing cover may be brought into contact with the airbag housing or the steering wheel to which the airbag housing is fixed, so that rotation of the housing cover may be inhibited.

The functional unit located at the center portion of the steering wheel may be a display device mounted to the steering wheel.

A control system for the driver seat airbag apparatus according to the present invention may include: a prediction part configured to predict a collision of the vehicle; and a controller configured to control an actuator so that a functional unit may be moved when the prediction part predicts the collision of the vehicle.

The control system may include: a detection part configured to detect a collision of the vehicle, wherein the controller may be connected to an inflator, and when the detection part detects the collision of the vehicle, the controller may control the inflator to unfold an airbag cushion.

A control method for the control system according to the present invention may include: predicting a collision of the vehicle; and first controlling, when the collision of the vehicle is predicted in the predicting, first controlling operation of the actuator to move a functional unit.

The control method may include: detecting the collision of the vehicle after the first controlling; and second controlling, when the collision of the vehicle is detected in the detecting, second controlling operation of an inflator to unfold an airbag cushion.

According to the present invention, the driver seat airbag apparatus for a vehicle is configured to operate both the actuator and the inflator simultaneously or rapidly operate the actuator before the inflator to move the functional unit so that the unfolding space of the airbag cushion expands between the functional unit and the steering wheel. Therefore, the airbag cushion can be prevented from hitting the functional unit in unfolding of the airbag cushion, thereby preventing breakage or scattering of the functional unit.

Furthermore, as the unfolding space of the airbag cushion expands, the airbag cushion can be prevented from being caught between the functional unit and the airbag housing, and can be rapidly unfolded to protect an occupant.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION

In the following description, the structural or functional description specified to exemplary embodiments according to the concept of the present invention is intended to describe the exemplary embodiments, so it should be understood that the present invention may be variously embodied, without being limited to the exemplary embodiments.

Embodiments described herein may be changed in various ways and various shapes, so specific embodiments are shown in the drawings and will be described in detail in this specification. However, it should be understood that the exemplary embodiments according to the concept of the present invention are not limited to the embodiments which will be described hereinbelow with reference to the accompanying drawings, but all of modifications, equivalents, and substitutions are included in the scope and spirit of the invention.

It will be understood that, although the terms first and/or second, etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent" or "directly adjacent" should be interpreted in the same manner as those described above.

The terminology used herein is for the purpose of describing particular embodiments only and is not intended to limit the present invention. Singular forms are intended to include plural forms unless the context clearly indicates otherwise It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present invention belongs. It must be understood that the terms defined by the dictionary are identical with the meanings within the context of the related art, and they should not be ideally or excessively formally defined unless the context clearly dictates otherwise.

Exemplary embodiments will be described hereafter in detail with reference to the accompanying drawings. Like reference numerals given in the drawings indicate like components.

Figure 1:
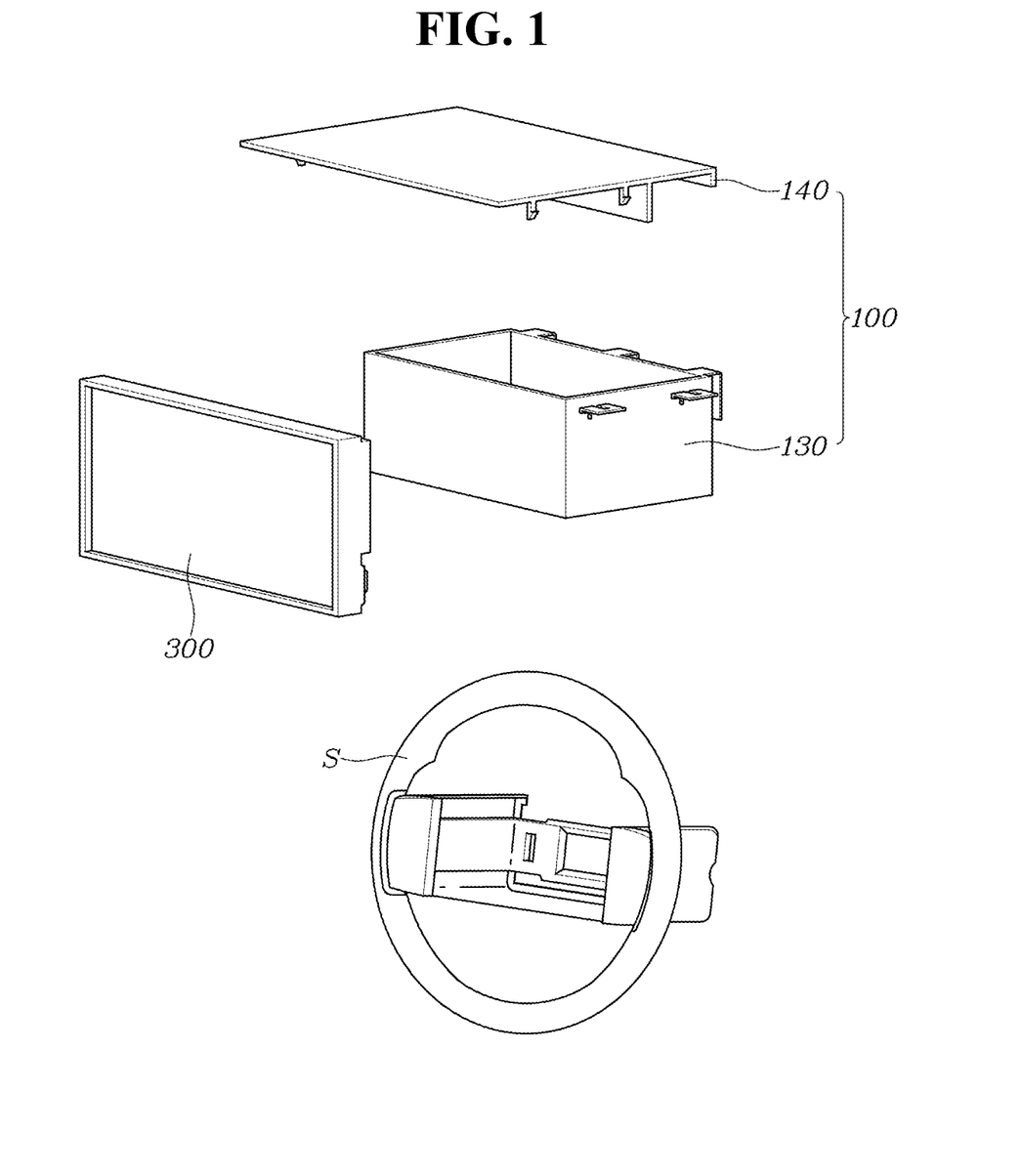
FIG. 1 is an exploded-perspective view showing a driver seat airbag apparatus for a vehicle according to an embodiment of the present invention.
Figure 2:
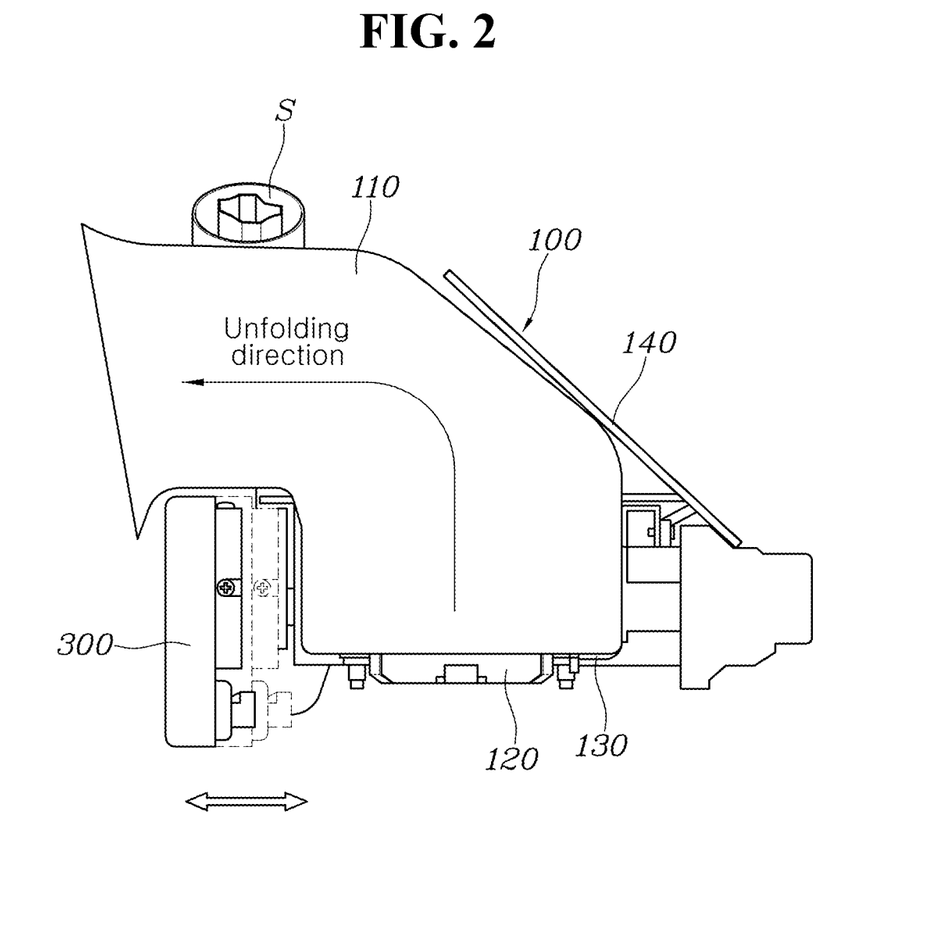
FIGS. 2 to 4 are side sectional views showing a functional unit moved and the airbag cushion unfolded in the driver seat airbag apparatus for a vehicle according to various embodiments of the present invention.
Figure 3:
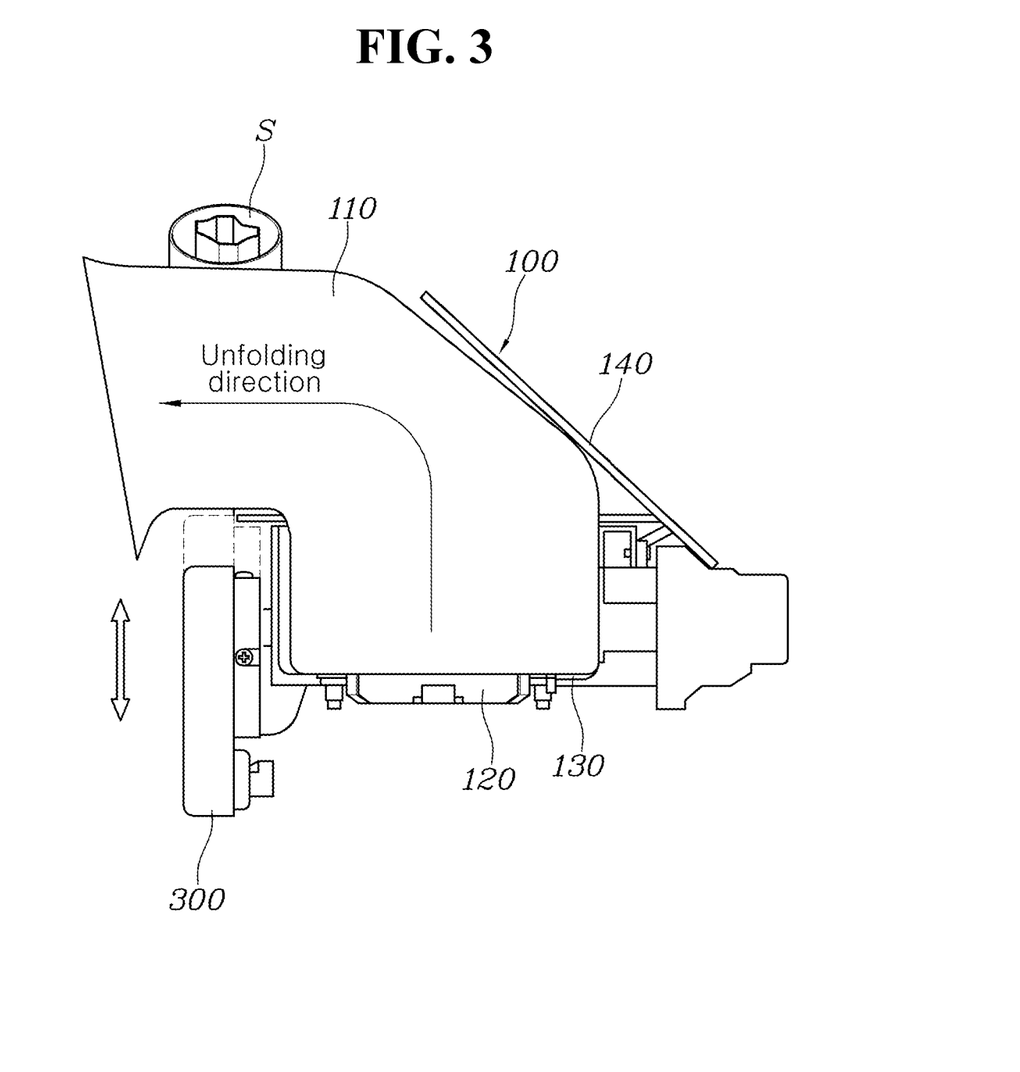
Figure 4:
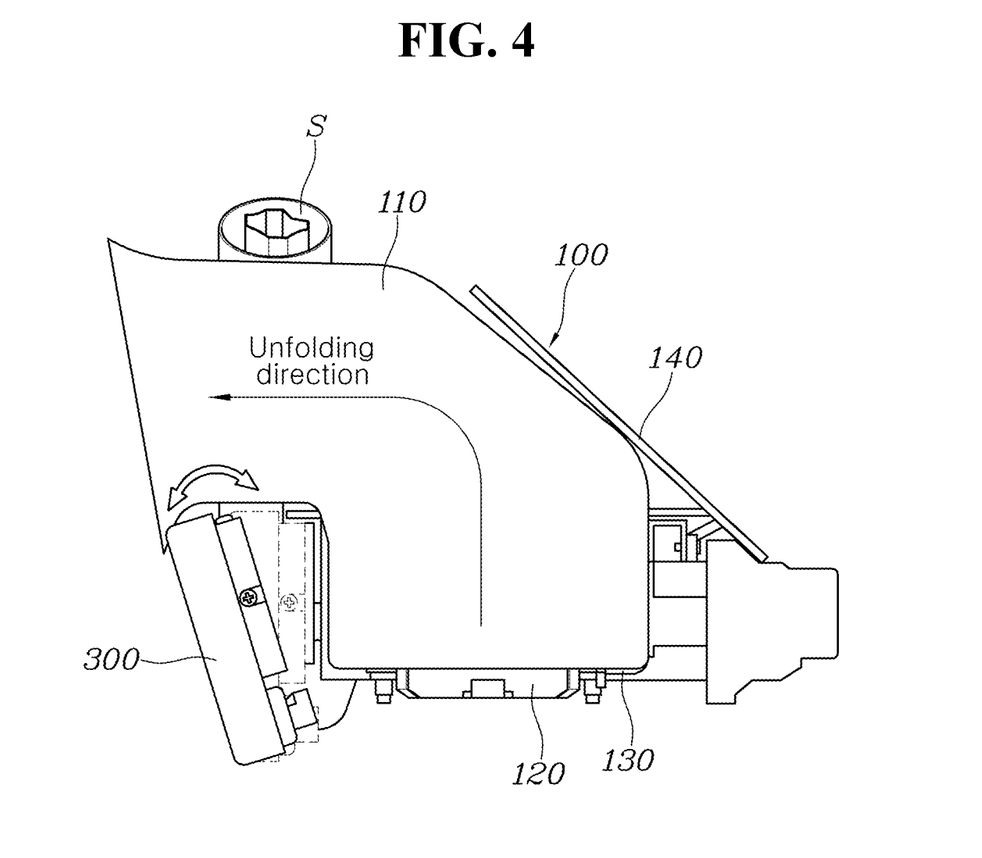
Figure 5:
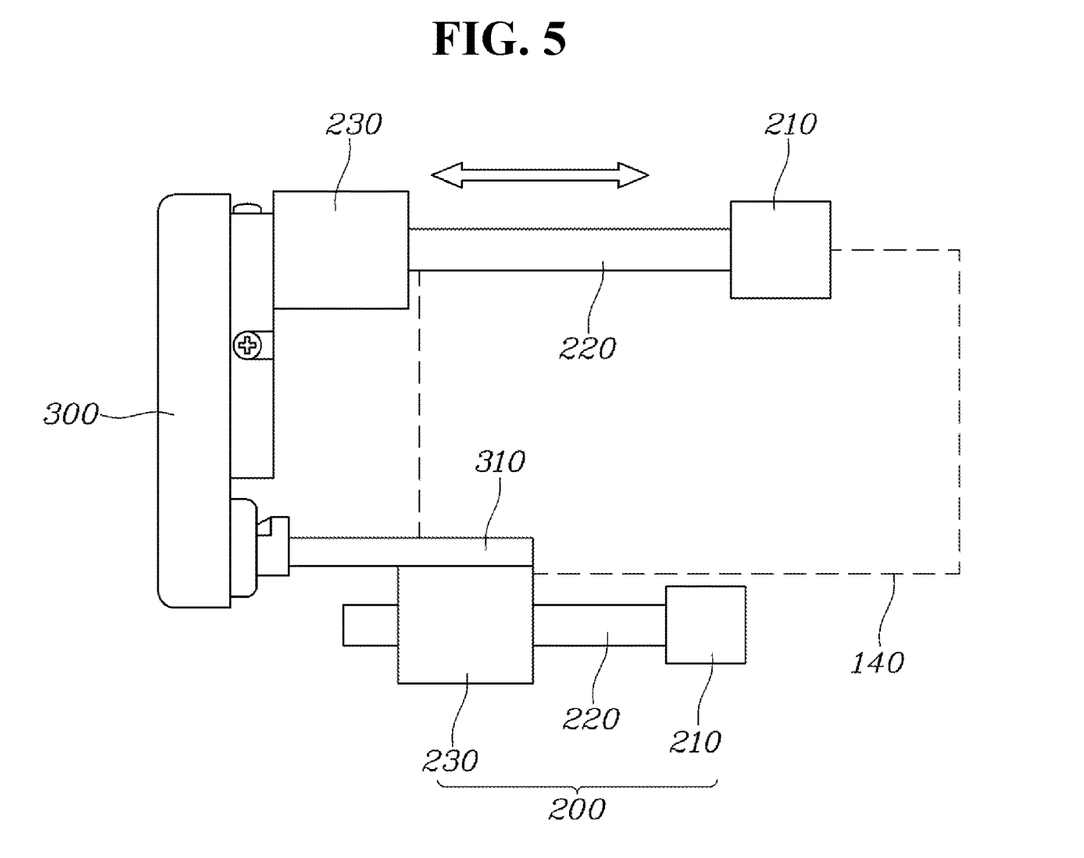
FIGS. 5 to 7 are side views showing an actuator moving the functional unit in the driver seat airbag apparatus for a vehicle according to various embodiments of the present invention.
Figure 6:
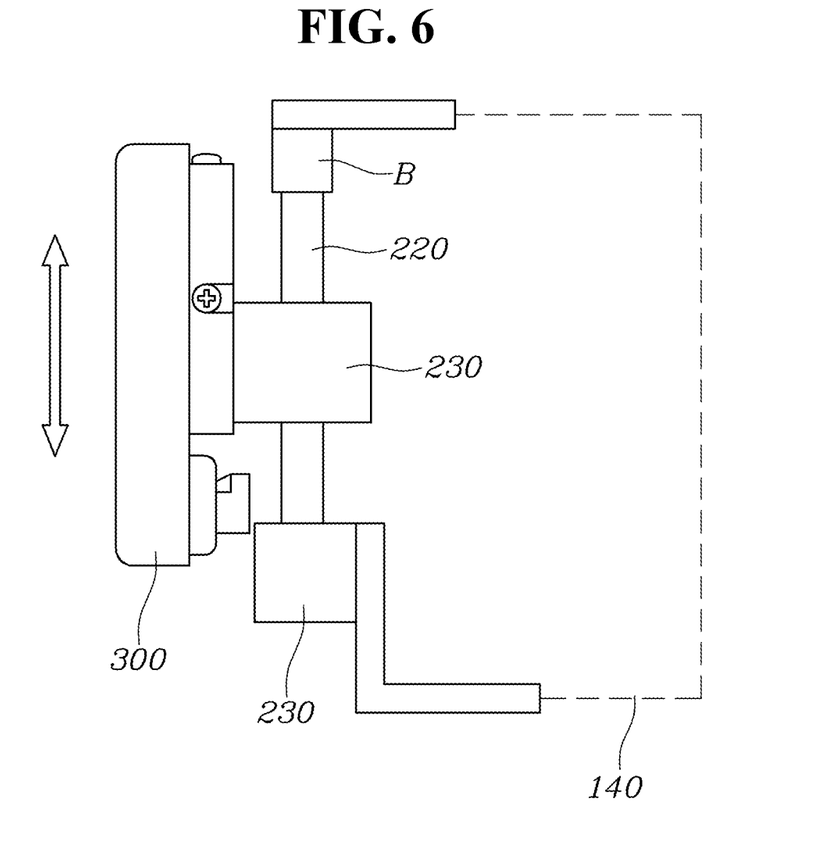
Figure 7:
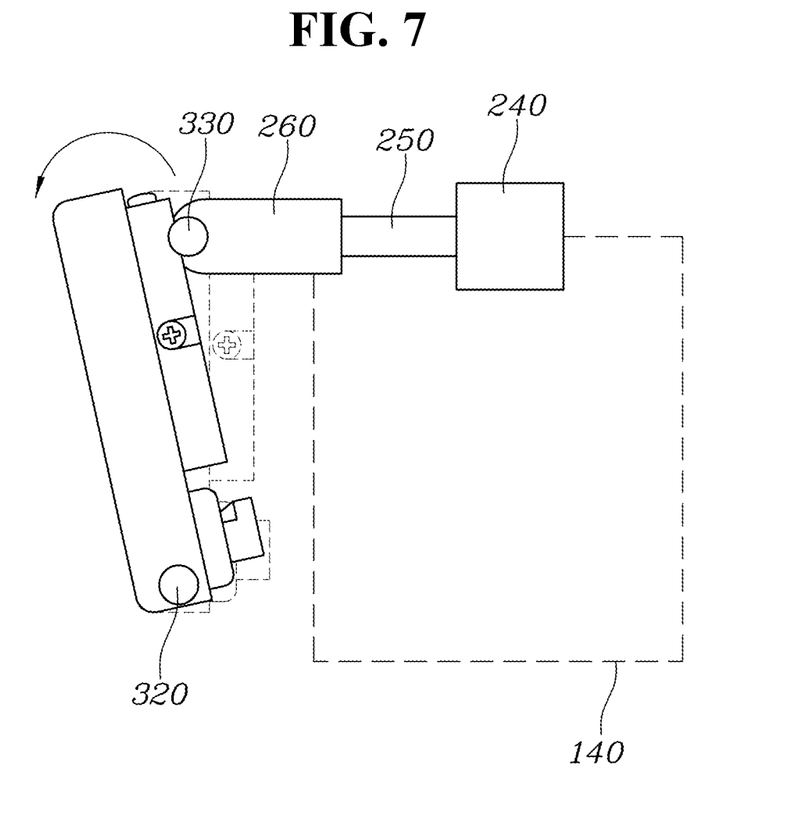

FIG. 1 is an exploded-perspective view showing a driver seat airbag apparatus for a vehicle according to an embodiment of the present invention. FIGS. 2 to 4 are side sectional views showing a functional unit 300 moved and an airbag cushion 110 unfolded in the driver seat airbag apparatus for a vehicle according to various embodiments of the present invention. FIGS. 5 to 7 are side views showing an actuator 200 moving the functional unit 300 in the driver seat airbag apparatus for a vehicle according to various embodiments of the present invention.

The driver seat airbag apparatus for a vehicle according to an exemplary embodiment of the present invention will be described referring to FIGS. 1 to 7.

According to the present invention, the driver seat airbag apparatus for a vehicle includes the airbag cushion 110 mounted at the steering wheel S and configured to deploy toward an occupant in a collision of a vehicle, so that it is possible to prevent the occupant from being damaged by a collision with the steering wheel S as the upper body of the occupant is moved due to an external impact.

The functional unit 300 may be mounted to a center portion of the steering wheel S, the airbag cushion 110 is deployed through a gap between the functional unit 300 and a rim connected to the center portion of the steering wheel S while avoiding the functional unit 300, so that it is possible to prevent the functional unit 300 from being broken and shattered due to unfolding pressure of the airbag cushion 110.

The driver seat airbag apparatus for a vehicle according to the present invention includes: an airbag module 100 including of the airbag cushion 110 and an inflator 120, and provided in rear of the functional unit 300 at the center portion of the steering wheel S; and the actuator 200 provided at the steering wheel S and connected to the functional unit 300, and configured to move the functional unit 300 in operation thereof so that an unfolding space of the airbag cushion 110 between the functional unit 300 and the airbag module 100 expands or increases.

The airbag module 100 is mounted to the steering wheel S at a rear portion of the steering wheel S. The airbag module 100 may include the airbag cushion 110 and the inflator 120. The inflator 120 receives a collision signal of the vehicle and injects gas into the airbag cushion 110 by explosion of explosive substances stored therein, whereby the airbag cushion 110 may be deployed toward the front of a driver.

The airbag cushion 110 is located at front of the driver in unfolding thereof, and may protect the driver from a collision with the steering wheel S.

When the actuator 200 is operated, the actuator 200 moves the functional unit 300 located at the center portion of the steering wheel S to increase or expand the unfolding space of the airbag cushion 110 through which the airbag cushion 110 passes between the functional unit 300 and the steering wheel S and is unfolded.

The actuator 200 may move the functional unit 300 in various methods including a vertical movement of the vehicle, a front-rear movement of the vehicle, or a rotating movement. Furthermore, the actuator 200 may be operated in various methods such as operation by motor, hydraulic, or electromagnet.

With expansion of the unfolding space, there is an effect of preventing the airbag cushion 110 from being mis-unfolded as the airbag cushion 110 is blocked by the functional unit 300 in unfolding thereof.

Furthermore, as the functional unit 300 is moved, there is an effect of preventing the functional unit 300 from being broken and shattered as the functional unit 300 is hit with the airbag cushion by the unfolding pressure generated when the airbag cushion 110 is unfolded.

The inflator 120 receives a collision signal of the vehicle to be operated. The actuator 200 may receive the collision signal of the vehicle and be operated simultaneously with the inflator 120 or receive a collision predicted signal of the vehicle to be operated at least before operation of the inflator 120.

The inflator 120 is operated by receiving a collision signal from a collision detection sensor of the vehicle to unfold the airbag cushion 110. The actuator 200 is operated simultaneously with operation of the inflator 120 to move the functional unit 300. Alternately, the actuator 200 is operated prior to the inflator 120 considering operating time of the actuator 200, and the functional unit 300 is moved before unfolding of the airbag cushion 110. Therefore, the unfolding space may increase or expand, and the airbag cushion 110 may be normally operated.

When the inflator 120 and the actuator 200 are operated simultaneously, the actuator 200 may be operated as fast as the inflator 120, which has a fast operating time.

As shown in FIGS. 2 to 7, the actuator 200 may move the functional unit 300 so that the functional unit 300 rotates in the front-rear direction of the steering wheel S, the vertical direction of the steering wheel S, or rotates with respect to a portion of the steering wheel, thereby increasing or expanding the unfolding space.

The actuator 200 may be embodied as an embodiment moving the functional unit 300 in various directions.

The actuator 200 may move the functional unit 300 forward from the center portion of the steering wheel S that is an initial location of the functional unit 300 to expand the unfolding space. The actuator 200 may move the functional unit 300 upward or downward from the center portion of the steering wheel S to increase or expand the unfolding space, and the actuator 200 may rotate a second portion of the functional unit 300 on a first portion thereof to expand the unfolding space.

As the functional unit 300 is moved by the actuator 200 to expand the unfolding space, the functional unit 300 may be precisely moved, and the functional unit 300 may be rapidly moved in response to a type of the actuator 200.

Next, as a first embodiment and a second embodiment of the actuator 200 of the present invention, the actuator 200 includes a first drive motor 210, a first spindle screw 220 coupled to a shaft of the first drive motor 210 and extended in a longitudinal direction of the shaft, and a first spindle nut 230 screw-coupled to the first spindle screw 220 and having a first portion connected to the functional unit 300. In operation of the first drive motor 210, movement of the first spindle nut 230 may move the functional unit 300 in the front-rear direction or the vertical direction of the steering wheel.

As shown in FIGS. 4 to 5, the first drive motor 210 is coupled to the steering wheel S or an airbag housing 130 storing the airbag cushion 110 therein. The first spindle screw 220 is extended in a longitudinal direction or a vertical direction of the vehicle, and is connected to the shaft of the first drive motor 210, and may be rotated in response to operation of the first drive motor 210. The first spindle nut 230 is screw-coupled to the first spindle screw 220, and may be moved in a longitudinal direction of the first spindle screw 220 in response to a rotating direction of the first spindle screw 220. The first spindle nut 230 is coupled to the functional unit 300, thereby moving the functional unit 300 in response to operation of the first drive motor 210.

As described above, as the actuator 200 moves the functional unit 300 in the longitudinal direction or the vertical direction of the vehicle by screw-rotation, there is effects of achieving precise movement of the functional unit 300 and of moving the functional unit 300 from the initial location thereof so that the unfolding space expands and then moving back the functional unit 300 to the initial location.

The functional unit 300 may include a bracket 310 extended from the rear of the functional unit 300 toward the first drive motor 210 and connected to the first spindle nut 230.

The functional unit 300 is coupled to the bracket 310 coupled to the rear of the functional unit 300 and extended rearward, and thus the functional unit 300 is coupled to the airbag housing 130 or the steering wheel S so as to be located in front of the steering wheel S. Furthermore, the bracket 310 is coupled to the first spindle nut 230 in response to the shape of the airbag housing 130 or the steering wheel S and may move the functional unit 300 in response to movement of the first spindle nut 230.

Hereinbelow, as a third embodiment of the present invention, the structure of expanding the unfolding space by the actuator 200 rotating the functional unit 300 will be described.

Specifically, the functional unit 300 has a lower portion rotatably provided at a first hinge 320, and the actuator 200 includes a second drive motor 240, a second spindle screw 250 coupled to a shaft of the second drive motor 240 and extended in a front-rear direction of the steering wheel S, and a second screw nut screw-coupled to the second spindle screw 250 and moved in a longitudinal direction of the second spindle screw 250 in rotation of the second spindle screw 250 and of which a first end is rotatably connected to an upper portion of the functional unit 300 by a second hinge 330. In operation of the second drive motor 240, the second screw nut is moved in the front-rear direction of the steering wheel S and thus the functional unit 300 may be rotated on the first hinge 320.

As shown in FIG. 7, the functional unit 300 is coupled to the steering wheel S or the airbag housing 130 by the first hinge 320 so that the lower portion of the functional unit 300 is rotatable. The upper portion of the functional unit 300 is rotatably coupled to the second spindle nut 260 by the second hinge 330 and the second spindle nut 260 is moved in the longitudinal direction of the vehicle in response to the rotation of the second spindle screw 250, so that the upper portion of the functional unit 300 is rotated on the first hinge 320 located at the lower portion of the functional unit 300 to expand the unfolding space.

Therefore, in unfolding of the airbag cushion 110, there is an effect of preventing the airbag cushion 110 from hitting the upper portion of the functional unit 300 and an effect of unfolding the airbag cushion 110 toward front of the occupant.

The airbag module 100 includes the airbag housing 130 in which the airbag cushion 110 is stored and the inflator 120 is mounted to a lower portion thereof and the airbag cushion 110 is deployed through an opening thereof, and is coupled to the steering wheel S. The functional unit 300 may be located in the front of the airbag housing 130.

As an embodiment, the airbag housing 130 may be a container with the opening at the upper portion thereof, and may have a cuboid shape without an upper surface thereof.

The airbag cushion 110 may be accommodated in the airbag housing 130. When gas is injected into the airbag cushion 110, the airbag cushion 110 may be deployed through a gap between the functional unit 300 and the steering wheel S toward the front of the steering wheel S. Specifically, the airbag cushion 110 may be deployed from the airbag housing 130 through the opening of the airbag housing 130.

The airbag housing 130 includes a gas generating device such as the inflator 120 therein, and the inflator 120 injecting gas into the airbag cushion 110 or supplying the gas from the outside of the airbag housing 130 may be connected to the airbag cushion 110.

The airbag module 100 may include a housing cover 140 coupled to the airbag housing 130 to cover the opening of the airbag housing 130, and broken by the unfolding pressure of the airbag cushion 110 and opening the airbag housing 130 toward the front of the steering wheel S at a limited angle.

When gas is injected into the airbag cushion 110, the unfolding pressure of the airbag cushion 110 is generated, and the housing cover 140 may open the opening of the airbag housing 130 while being broken by the unfolding pressure of the airbag cushion 110.

Specifically, the housing cover 140 may open the opening of the airbag housing 130 while being rotated on the airbag housing 130. Particularly, the housing cover 140 may open the opening of the airbag housing 130 toward the front of the steering wheel S. Therefore, the housing cover 140 may guide the airbag cushion 110 so that the airbag cushion is unfolded toward the front of the steering wheel S.

Furthermore, the housing cover 140 may limit an angle at which the airbag housing 130 opens toward the front of the steering wheel S. As an embodiment, the rotation of the housing cover 140 may be limited within a rotating angle preset based on the airbag housing 130, so that the opening angle may be limited.

Therefore, the housing cover 140 partially opens the upper opening of the airbag housing 130 at a limited angle toward the front of the steering wheel S. Accordingly, the airbag cushion 110 may be guided to allow the airbag cushion 110 to be rotated toward the front of the steering wheel S.

The housing cover 140 is rotated on the airbag housing 130 such that a front end thereof is moved upward, so that the airbag housing 130 may open toward the front of the steering wheel S.

As an embodiment, a rear end of the housing cover 140 is rotatably coupled to the airbag housing 130, so that the housing cover 140 may be rotated in a direction in which the front end thereof is moved upward.

As another embodiment, the housing cover 140 is rotatably coupled to the airbag housing 130 at a portion between the front end and the rear end thereof, and the housing cover 140 is rotated on the airbag housing 130 in a direction in which the front end thereof is moved upward. Accordingly, the rear end may be rotated in a downward movable direction.

The rear end of the housing cover 140 is extended more rearward than a rear end of the airbag housing 130 in the front-rear direction of the steering wheel S, and the rear end of the housing cover 140 is brought into contact with the airbag housing 130 or the steering wheel S to which the airbag housing 130 is fixed as the housing cover 140 is rotated on the airbag housing 130, rotation of the housing cover 140 may be limited.

The housing cover 140 is rotated on the airbag housing 130 in the direction in which the front end thereof is moved upward, so that the rear end of the housing cover 140 extended more rearward than the rear end of the airbag housing 130 may be moved downward.

The rear end of the housing cover 140 moved downward is brought into contact with the airbag housing 130 or the upper portion of a steering housing H, so that the housing cover 140 may be prevented from being further rotated based on the airbag housing 130. In other words, the front end of the housing cover 140 may be prevented from being no longer moved upward. Therefore, the housing cover 140 may be prevented from being rotated at the limited angle toward the front of the steering wheel S.

As another embodiment, the housing cover 140 is brought into contact with an inner circumferential surface of the steering wheel S, as the housing cover 140 is rotated upward on the rear end of the airbag housing 130, so that the housing cover 140 may be prevented from being rotated.

As the housing cover 140 is rotated in the direction of the front end thereof is moved upward, the front end of the housing cover 140 is brought into contact with the inner circumferential surface of the steering wheel S and the rotation of the housing cover 140 may be restrained so that the front end thereof is not moved more upward.

In the above case, the front end of the housing cover 140 is moved forward while being rotated upward, so that the front end of the housing cover 140 may be brought into contact with the steering wheel S located relatively in front of the front end of the housing cover 140.

The functional unit 300 located at the center portion of the steering wheel S may be a display device mounted to the steering wheel S and configured to perform a function of displaying information related to vehicle operations, driving conditions, etc.

The display device may be a display device for infotainment of the driver, and may be a display device for showing vehicle conditions or a screen of a navigation system.

According to another embodiment, the functional unit 300 may be an emblem mounted to the steering wheel S or an emblem with a lighting device.

According to an exemplary embodiment of the present invention, a prediction part 10, a controller 20, and a detection part 30 may be implemented by a nonvolatile memory (not shown), which consists of an algorithm configured to control operations of various components of a vehicle or data regarding software instructions to play the algorithm, and a processor (not shown), which is configured to perform operations described below using the data stored in the memory. The memory and processor may be implemented as separate chips. Alternatively, the memory and processor may be implemented as single chips integrated with each other. The processor may take the form of one or more processors.

Figure 8:
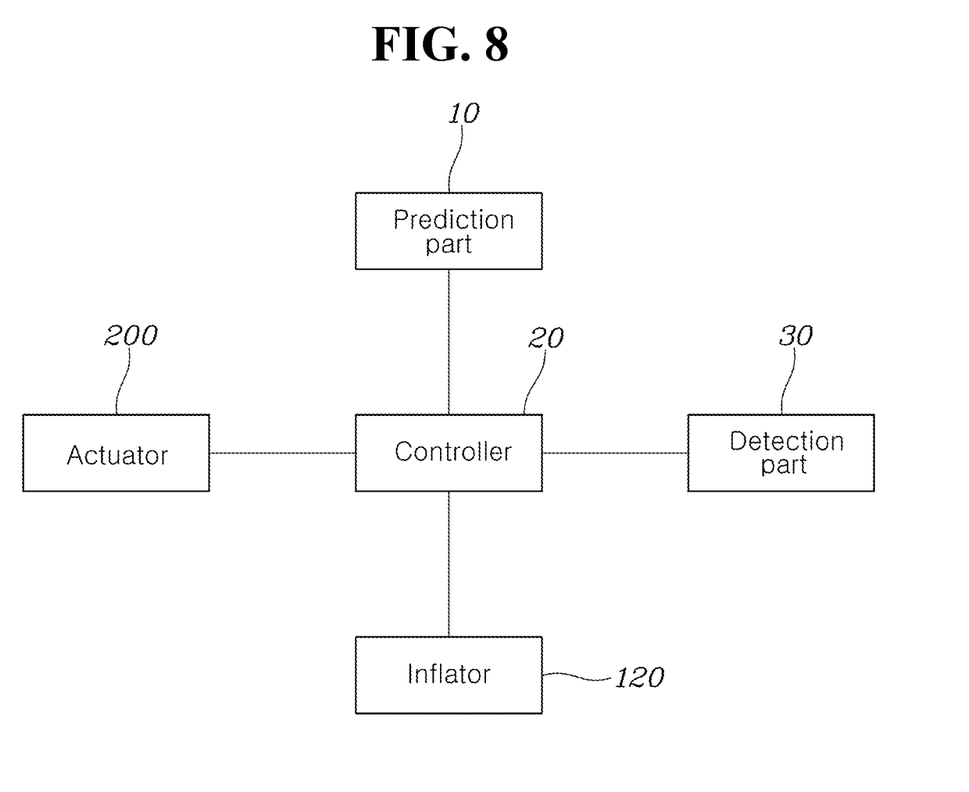
FIG. 8 is a block diagram showing a control system of the driver seat airbag apparatus for a vehicle according to an embodiment of the present invention.

FIG. 8 is a block diagram showing a control system of the driver seat airbag apparatus for a vehicle according to the embodiment of the present invention.

Referring to FIG. 8, the control system of the driver seat airbag apparatus for a vehicle according to the present invention will be described.

The control system of the driver seat airbag apparatus for a vehicle according to the present invention includes the prediction part 10; and the controller 20 controlling the actuator 200 to move the functional unit 300 when the prediction part 10 predicts a collision of the vehicle.

The prediction part 10 predicts the collision probability of the vehicle with a target while being connected to the detection sensor provided in the vehicle. The controller 20 may operate the actuator 200 when the prediction part 10 predicts a collision of the vehicle and then move the functional unit 300.

The control system includes the detection part 30 detecting a collision of the vehicle. The controller 20 is connected to the inflator 120 and when the detection part 30 detects a collision of the vehicle the controller 20 may control the inflator 120 to unfold the airbag cushion 110.

Figure 9:
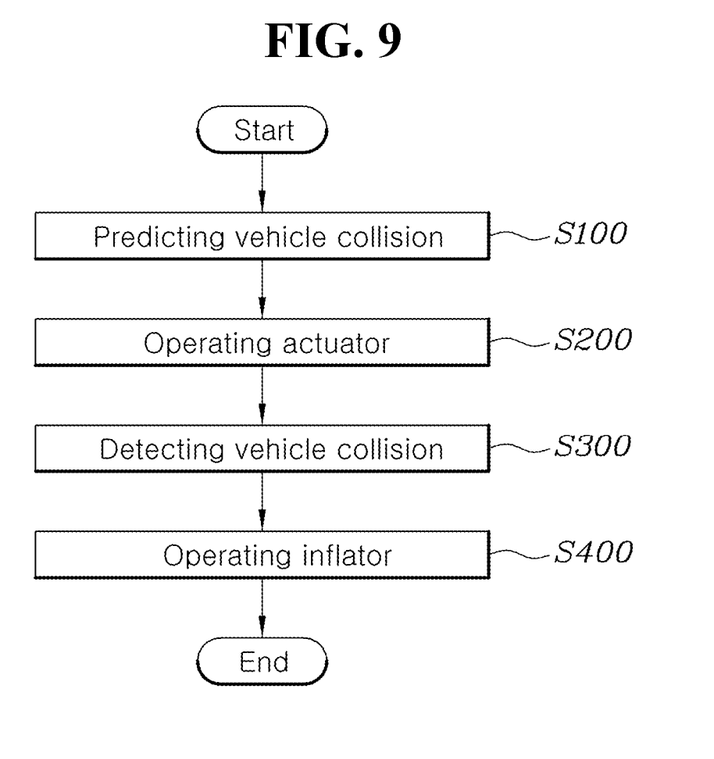
FIG. 9 is a flowchart showing a control method of the driver seat airbag apparatus for a vehicle according to an embodiment of the present invention.

FIG. 9 is a flowchart showing a control method of the driver seat airbag apparatus for a vehicle according to an embodiment of the present invention.

Referring to FIG. 9, the control method of the driver seat airbag apparatus for a vehicle according to the present invention will be described.

The control method of the driver seat airbag apparatus for a vehicle according to the present invention includes predicting a collision of the vehicle at S100; and first controlling the actuator 200 at S200 when a collision of the vehicle is predicted in the predicting at S100 so that the actuator 200 is operated to move the functional unit 300.

The control method may include detecting a collision of the vehicle after the first controlling S200 at S300; and second controlling the inflator 120 at S400 when a collision of the vehicle is detected in the detecting at S300 so that the airbag cushion 110 is unfolded.

Although the preferred embodiments of the present invention have been disclosed for illustrative purposes, those skilled in the art will appreciate that various modifications, additions, and substitutions are possible, without departing from the spirit and scope of the present invention.

What is claimed is:

1. A driver seat airbag apparatus for a vehicle comprising a steering wheel having (1) a functional unit located at a center portion of the steering wheel, facing a driver of the vehicle and configured to perform a function, and (2) a rim connected to the center portion of the steering wheel, the driver seat airbag apparatus comprising:
   an airbag module disposed at a rear of the functional unit and comprising an airbag cushion and an inflator, the airbag cushion configured to deploy toward the driver through a space between the functional unit and the rim of the steering wheel; and
   an actuator connected to the functional unit and configured to move the functional unit to increase the space between the functional unit and the rim of the steering wheel
   wherein the actuator comprises (1) a first drive motor, (2) a first spindle screw coupled to a shaft of the first drive motor and extending in a longitudinal direction of the shaft, and (3) a first screw nut coupled to the first spindle screw and having a portion connected to the functional unit, and
   wherein the actuator is configured to move the functional unit in a front-rear or vertical direction of the steering wheel in response to movement of the first spindle nut.

2. The driver seat airbag apparatus of claim 1, wherein:
   the inflator is further configured to receive a vehicle collision signal, and
   the actuator is further configured to:
      receive (1) the vehicle collision signal simultaneously with the inflator, or (2) a collision expectation signal before the inflator receives the vehicle collision signal,
      move the functional unit simultaneously with the inflator supplying gas to the airbag cushion when the vehicle collision signal is received, and
      move the functional unit before the inflator supplies the gas to the airbag cushion when the collision expectation signal is received, wherein the vehicle collision signal indicates that a vehicle collision has occurred, and the collision expectation signal indicates that a vehicle collision is about to occur.

3. The driver seat airbag apparatus of claim 1, wherein the functional unit comprises a bracket extending toward the first drive motor from a rear portion of the functional unit and connected to the first spindle nut.

4. The driver seat airbag apparatus of claim 1, wherein:
the airbag module further comprises an airbag housing coupled to the steering wheel, having an upper opening and storing the airbag cushion,
the airbag cushion, as configured, unfolds and expands through the upper opening of the airbag housing when deployed,
the inflator is positioned at a lower portion of the airbag housing, and
the functional unit is located at a front of the airbag housing.

5. The driver seat airbag apparatus of claim 4, wherein the airbag module further comprises a housing cover coupled to and covering the airbag housing, covering the opening of the airbag housing, and arranged to separate from the airbag housing and expose the upper opening of the airbag housing toward a front of the steering wheel when the airbag cushion unfolds.

6. The driver seat airbag apparatus of claim 5, wherein the housing cover, as configured, rotates with respect to the airbag housing so that a front end of the housing cover moves upwardly and the upper opening of the airbag housing is exposed toward the front of the steering wheel.

7. The driver seat airbag apparatus of claim 1, wherein the functional unit comprises a display device configured to perform a display function.

8. The driver seat airbag apparatus of claim 1, further comprising a control system including:
a prediction part configured to predict a collision of the vehicle; and
a controller configured to control the actuator to move the functional unit when the prediction part predicts the collision of the vehicle.

9. The driver seat airbag apparatus of claim 8, wherein the control system further includes a detection part configured to detect a collision of the vehicle, wherein the controller is further configured to control the inflator to deploy the airbag cushion when the detection part detects the collision of the vehicle.

10. A driver seat airbag apparatus for a vehicle comprising a steering wheel having (1) a functional unit located at a center portion of the steering wheel, facing a driver of the vehicle and configured to perform a function, and (2) a rim connected to the center portion of the steering wheel, the driver seat airbag apparatus comprising:
an airbag module disposed at a rear of the functional unit and comprising an airbag cushion and an inflator, the airbag cushion configured to deploy toward the driver through a space between the functional unit and the rim of the steering wheel; and
an actuator connected to the functional unit and configured to move the functional unit to increase the space between the functional unit and the rim of the steering wheel,
wherein the airbag module further comprises an airbag housing coupled to the steering wheel, having an upper opening and storing the airbag cushion, wherein the functional unit is disposed at a front of the airbag housing, the inflator is disposed at a lower portion of the airbag housing, and the airbag cushion is configured to deploy through the upper opening of the airbag housing when the airbag cushion is inflated,
wherein the airbag module further comprises a housing cover coupled to and covering the opening of the airbag housing and configured to be separated from the airbag housing and expose the upper opening of the airbag housing toward a front of the steering wheel when the airbag cushion is inflated,
wherein the housing cover is configured to rotate with respect to the airbag housing so that a front end of the housing cover moves upwardly and the upper opening of the airbag housing is exposed toward the front of the steering wheel, and
wherein the housing cover has a rear end extending rearwardly beyond a rear end of the airbag housing, and the rear end of the housing cover is arranged to be brought into contact with the airbag housing or the steering wheel to limit a rotation of the housing cover when the housing cover rotates with respect to the airbag housing.

* * * * *